United States Patent
Yang et al.

(10) Patent No.: US 11,745,279 B2
(45) Date of Patent: Sep. 5, 2023

(54) SYSTEM AND METHOD FOR MACHINING WORKPIECE AND ARTICLE MACHINED THEREFROM

(71) Applicant: GENERAL ELECTRIC COMPANY, Schenectady, NY (US)

(72) Inventors: Yong Yang, Minghang District (CN); Bin Wei, Shanghai (CN); Meisam Salahshoor Pirsoltan, Niskayuna, NY (US); Ming Jia, Shanghai (CN); Huiyu Xu, Shanghai (CN); Yibo Gao, Shanghai (CN); William T. Carter, Niskayuna, NY (US); Andrew L. Trimmer, Niskayuna, NY (US); Prabhjot Singh, Niskayuna, NY (US); Pinghai Yang, Niskayuna, NY (US); Yanzhe Yang, Dayton, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/302,809

(22) PCT Filed: May 5, 2017

(86) PCT No.: PCT/US2017/031278
§ 371 (c)(1),
(2) Date: Nov. 19, 2018

(87) PCT Pub. No.: WO2017/218101
PCT Pub. Date: Dec. 21, 2017

(65) Prior Publication Data
US 2019/0299309 A1    Oct. 3, 2019

(30) Foreign Application Priority Data
Jun. 17, 2016   (CN) .......................... 201610436866.6

(51) Int. Cl.
*C25F 3/02* (2006.01)
*B23H 11/00* (2006.01)
(Continued)

(52) U.S. Cl.
CPC ................ *B23H 11/00* (2013.01); *B22F 3/24* (2013.01); *B22F 5/10* (2013.01); *B22F 10/12* (2021.01);
(Continued)

(58) Field of Classification Search
None
See application file for complete search history.

(56) References Cited

U.S. PATENT DOCUMENTS

| | | | |
|---|---|---|---|
| 2,929,769 A * | 3/1960 | Newell | .................... C25D 7/04 204/290.08 |
| 3,338,807 A | 8/1967 | Clifford | |

(Continued)

FOREIGN PATENT DOCUMENTS

| | | |
|---|---|---|
| CN | 101983261 A | 3/2011 |
| CN | 102925950 A | 2/2013 |

(Continued)

OTHER PUBLICATIONS

English translation JP 2010059531, Yamamoto et al. Mar. 18, 2010 (Year: 2010).*

(Continued)

*Primary Examiner* — Stefanie S Wittenberg
(74) *Attorney, Agent, or Firm* — Dority & Manning, P.A.

(57) ABSTRACT

A system is configured for machining a workpiece (100), the workpiece includes an interior surface (110) that defines an internal passage (112). The system includes an electrode (116) located within the internal passage and electrically isolated from the workpiece, an electrolyte supply, a power supply, and a remover. The electrolyte supply is configured (Continued)

for circulating an electrolyte in a gap between the electrode and the workpiece. The power supply is configured for applying a voltage between the electrode and the workpiece to facilitate smoothing the interior surface. The remover is configured for completely removing the electrode from within the internal passage after smoothing the interior surface.

18 Claims, 9 Drawing Sheets

(51) Int. Cl.
    *B22F 3/24*     (2006.01)
    *B23H 3/04*     (2006.01)
    *C25F 3/06*     (2006.01)
    *B23H 9/14*     (2006.01)
    *B22F 5/10*     (2006.01)
    *C25F 7/00*     (2006.01)
    *B33Y 40/20*     (2020.01)
    *B22F 10/12*     (2021.01)
    *B22F 10/25*     (2021.01)
    *B22F 10/28*     (2021.01)
    *B22F 10/70*     (2021.01)
    *B33Y 10/00*     (2015.01)
    *B33Y 80/00*     (2015.01)
    *B23H 9/10*     (2006.01)
    *B22F 12/53*     (2021.01)
    *B22F 10/40*     (2021.01)
    *B22F 10/62*     (2021.01)
    *B22F 10/64*     (2021.01)

(52) U.S. Cl.
CPC .............. *B22F 10/25* (2021.01); *B22F 10/28* (2021.01); *B22F 10/70* (2021.01); *B23H 3/04* (2013.01); *B23H 9/14* (2013.01); *B33Y 40/20* (2020.01); *C25F 3/02* (2013.01); *C25F 3/06* (2013.01); *C25F 7/00* (2013.01); *B22F 10/40* (2021.01); *B22F 10/62* (2021.01); *B22F 10/64* (2021.01); *B22F 12/53* (2021.01); *B22F 2003/247* (2013.01); *B23H 9/10* (2013.01); *B33Y 10/00* (2014.12); *B33Y 80/00* (2014.12)

(56) References Cited

U.S. PATENT DOCUMENTS

| | | | |
|---|---|---|---|
| 3,365,381 A | | 1/1968 | Fromson |
| 3,372,099 A | | 3/1968 | Clifford |
| 3,459,645 A | | 8/1969 | Wilson et al. |
| 3,630,877 A | | 12/1971 | Koike et al. |
| 4,394,243 A | | 7/1983 | Hoffmann |
| 5,059,289 A | * | 10/1991 | Gaskell ................ F02M 61/168 |
| | | | 204/280 |
| 5,461,769 A | | 10/1995 | McGregor |
| 5,820,744 A | | 10/1998 | Edwards et al. |
| 6,103,094 A | | 8/2000 | Gleason et al. |
| 6,217,726 B1 | * | 4/2001 | Lorincz ..................... C25F 3/16 |
| | | | 204/279 |
| 6,470,160 B1 | | 10/2002 | Murakami et al. |
| 6,835,299 B1 | | 12/2004 | Tchugunov |
| 6,969,457 B2 | | 11/2005 | MacDonald et al. |
| 2001/0048972 A1 | * | 12/2001 | Fernihough ........... C23C 16/045 |
| | | | 427/250 |
| 2008/0230396 A1 | * | 9/2008 | Lee .......................... B23H 3/06 |
| | | | 205/660 |
| 2013/0299339 A1 | * | 11/2013 | Watson ................. B05D 3/0254 |
| | | | 204/196.1 |
| 2015/0001093 A1 | | 1/2015 | Carter et al. |
| 2015/0010461 A1 | | 1/2015 | Cronin |
| 2015/0014281 A1 | | 1/2015 | Trimmer et al. |
| 2015/0144496 A1 | | 5/2015 | Morris et al. |
| 2015/0251262 A1 | | 9/2015 | Kobayashi et al. |

FOREIGN PATENT DOCUMENTS

| | | | | |
|---|---|---|---|---|
| CN | 103480930 A | | 1/2014 | |
| CN | 105081487 A | | 11/2015 | |
| DE | 102012102325 | * | 7/2013 | ............... B23H 3/04 |
| EP | 2540876 A1 | | 1/2013 | |
| EP | 2671660 A2 | | 12/2013 | |
| EP | 2947183 A1 | | 11/2015 | |
| FR | 2469202 | * | 5/1981 | ............. C25B 11/04 |
| GB | 2059441 A | | 4/1981 | |
| GB | 2429465 | * | 2/2007 | ............. C23C 10/48 |
| JP | S63137200 A | | 6/1988 | |
| JP | 2003/191134 A | | 7/2003 | |
| TW | I384096 B | | 2/2013 | |
| WO | WO-2005054547 A2 | * | 6/2005 | ............... C25D 1/08 |
| WO | 2008058513 A1 | | 5/2008 | |
| WO | 2014133207 A1 | | 9/2014 | |
| WO | 2016064463 A1 | | 4/2016 | |

OTHER PUBLICATIONS

Machine Translated Japanese Office Action Corresponding to Application No. 2018565378 dated Mar. 2, 2020.
Rajurkar et al., "New Developments in Electro-Chemical Machining", CIRP Annals—Manufacturing Technology, vol. 48, Issue: 2, pp. 567-579, 1999.
Wang et al., "Preparation of Turbulated Cooling Hole for Gas Turbine Blade Using Electrochemical Machining", Key Engineering Materials, vol. 329, pp. 699-704, Jan. 2007.
International Search Report and Written Opinion dated Oct. 2, 2017 which was issued in connection with PCT application No. PCT/US2017/031278 which was filed on May 5, 2017.
Chinese Office Action Corresponding to CN Application No. 2016104368666 dated Nov. 1, 2018.
Chinese Office Action Corresponding to CN Application No. 2016104368666 dated Jun. 3, 2019.
Chinese Search Report Corresponding to Application No. 201610436866 on dated Jul. 28, 2020.
Huang Ji et al., "Fundamentals of Mould Engineering", Chinese Geological University Press, 1st Edition, Jul. 31, 2007, p. 143.

* cited by examiner

SYSTEM AND METHOD FOR MACHINING WORKPIECE AND ARTICLE MACHINED THEREFROM

BACKGROUND

Embodiments of the present invention relate to a system and a method for machining a workpiece, and an article machined therefrom.

Additive manufacturing is a technology that enables "3D-printing" of workpieces of various materials including metals and plastics. In additive manufacturing, a workpiece is built in a layer-by-layer manner. For example, each layer of the workpiece may be manufactured by leveling powder and selectively fusing the powder using a high-power laser. After each layer, more powder is added and the laser forms the next layer, simultaneously fusing it to the prior layers. The workpiece typically has a rough surface that is improved via post-build process such as grit blasting, grinding, sanding, or polishing to meet industry standards. These processes improve surface finish for external easy-to-reach surfaces of the workpiece, but are generally insufficient for interior surfaces of the workpiece. Surface finish of the interior surfaces needs to be improved to mitigate workpiece failures due to conditions such as fracture, low-cycle fatigue, high-cycle fatigue, and coking.

Electrochemical machining (ECM) is also a method for improving surface finish. Due to high metal removal rates of ECM, sufficient smoothing of the interior surfaces may be achieved without thermal or mechanical stress being transferred to the workpiece. In the ECM process, a cathode, or tool, is advanced toward an anode, or the workpiece. A gap between the cathode and the anode is filled with an electrolyte. As ions cross the gap between the cathode and the anode, material is dissolved from the anode and the electrolyte carries away the metal hydroxide formed in the ECM process. ECM can improve surface finish of the interior surface of an additively manufactured workpiece. However, the complex geometry of certain workpiece prevents the conventional cathode from gaining access to the interior surface. For example, an internal passage defined in the interior surface may be larger than an access port that provides access to the internal passage. Additionally, the internal passage may twist and turn through a complex path, it may be difficult to place the cathode within the internal passage. Furthermore, the cathode needs to be electrically isolated from the workpiece to ensure successful surface finish enhancement of the interior surface using the ECM process. Moreover, it may be difficult to remove the cathode from within the complex internal passage of the workpiece after the ECM process is complete.

The aforementioned issues also exist in improving surface finish of the interior surface of a workpiece that is not formed by additive manufacturing.

Therefore, there is a need for an improved system and method to address at least some of the aforementioned issues.

BRIEF DESCRIPTION

In accordance with one exemplary embodiment disclosed herein, a system is provided for machining a workpiece, and the workpiece includes an interior surface that defines an internal passage. The system includes an electrode located within the internal passage and electrically isolated from the workpiece, an electrolyte supply, a power supply, and a remover. The electrolyte supply is configured for circulating an electrolyte in a gap between the electrode and the workpiece. The power supply is configured for applying a voltage between the electrode and the workpiece to facilitate smoothing the interior surface. The remover is configured for completely removing the electrode from within the internal passage after smoothing the interior surface.

In accordance with another exemplary embodiment disclosed herein, a method is provided for machining a workpiece, and the workpiece includes an interior surface that defines an internal passage. The method includes: providing an electrode that is located within the internal passage and is electrically isolated from the workpiece; circulating an electrolyte in a gap between the electrode and the workpiece; applying a voltage between the electrode and the workpiece to facilitate smoothing the interior surface; and completely removing the electrode from within the internal passage after smoothing the interior surface.

In accordance with yet another exemplary embodiment disclosed herein, an article is provided and machined from a workpiece by a process, and the workpiece includes an interior surface that defines an internal passage. The process includes: providing an electrode that is located within the internal passage and is electrically isolated from the workpiece; circulating an electrolyte in a gap between the electrode and the workpiece; applying a voltage between the electrode and the workpiece to facilitate smoothing the interior surface; and completely removing the electrode from within the internal passage after smoothing the interior surface.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

In an effort to provide a concise description of these embodiments, not all features of an actual implementation are described in one or more specific embodiments. It should be appreciated that in the development of any such actual implementation, as in any engineering or design project, numerous implementation-specific decisions must be made to achieve the developers' specific goals, such as compliance with system-related and business-related constraints, which may vary from one implementation to another.

Unless defined otherwise, technical and scientific terms used herein have the same meaning as is commonly understood by one of ordinary skill in the art to which this disclosure belongs. The terms "first," "second," and the like, as used herein do not denote any order, quantity, or importance, but rather are used to distinguish one element from another. Also, the terms "a" and "an" do not denote a limitation of quantity, but rather denote the presence of at least one of the referenced items; and terms "bottom" and/or "top", unless otherwise noted, are merely used for convenience of description, and are not limited to any one position or spatial orientation. Moreover, the term "or" is meant to be inclusive and mean either any, several, or all of the listed items. The use of "including", "comprising", or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. The term "controller" may include either a single component or a plurality of components, which are either active and/or passive components and may be optionally connected or otherwise coupled together to provide the described function.

Figure 1:
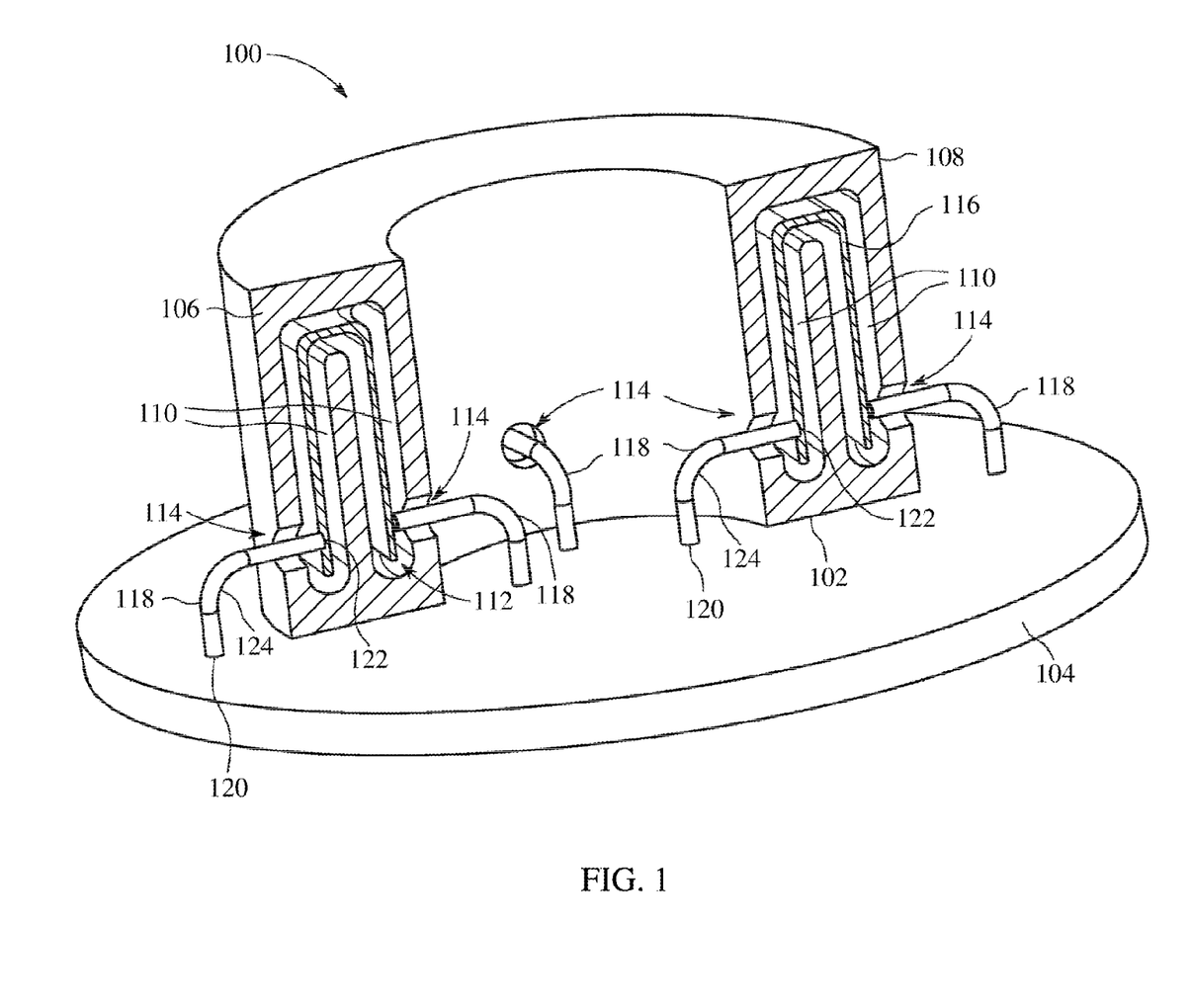
FIG. 1 is a perspective cross-sectional view of a workpiece and an electrode.
Figure 2:
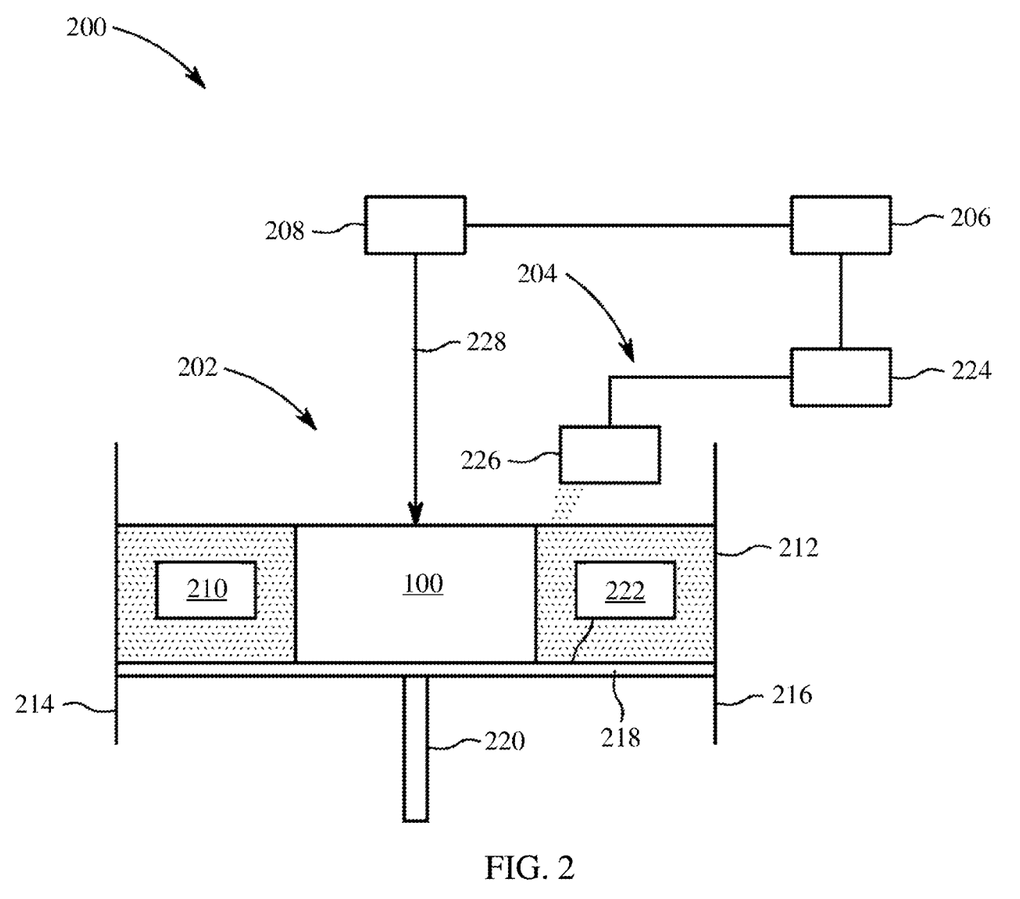
FIG. 2 is a schematic view of an additive manufacturing system for manufacturing the workpiece and the electrode of FIG. 1.

FIG. 1 is a perspective cross-sectional view of a workpiece 100 and an electrode 116. In the embodiment, the workpiece 100 may be formed by an additive manufacturing system 200, as shown in FIG. 2, for example. In other embodiments, the workpiece 100 may be formed by other methods rather than the additive manufacturing method.

The workpiece 100 includes a body portion 106 and a build plate 104. The body portion 106 is coupled at a bottom surface 102 thereof to the electrically conductive build plate 104. In the exemplary embodiment, the workpiece 100 may be a gas turbine fuel nozzle or a turbine rotor blade to be machined for example. In other embodiments, the workpiece 100 may be any suitable workpiece that is formed using additive manufacturing.

The body portion 106 having an exterior surface 108. In the exemplary embodiment, the body portion 106 includes an interior surface 110 that defines an internal passage 112 within the workpiece 100. The electrode 116 may be formed within the internal passage 112 by the additive manufacturing system 200, as shown in FIG. 2, for example. In other embodiments, the body portion 106 includes a plurality of interior surfaces 110 (not shown) that define respective internal passages 112 (not shown) within the workpiece 100.

In the embodiment, the workpiece 100 includes five access ports 114, each of the access ports 114 extends through the workpiece 100 between the exterior surface 108 of the body portion 106 and the interior surface 110 of the internal passage 112. As a result, each of the access ports 114 provides access to the internal passage 112. In other embodiments, the workpiece 100 may include one access port 114, two access ports 114, three access ports 114, four access ports 114, or more than five access ports 114 (not shown) for example.

In the embodiment, the electrode 116 is located within the internal passage 112 and does not contact the interior surface 110 or any other portion of the body portion 106. In other embodiments, a plurality of electrodes 116 (not shown) are located within the internal passage 112 and do not contact the interior surface 110 or any other portion of the body portion 106.

In the exemplary embodiment, the electrode 116 includes a solid electrode, a hollow electrode, or a combination thereof. Generally, the electrode 116 may have any structure that facilitates ECM operation as described herein.

In the embodiment, the workpiece 100 includes five anchors 118 coupled between the build plate 104 and the electrode 116. More specifically, each of the anchors 118 includes a first end portion 120 coupled to the build plate 104, a second end portion 122 coupled to the electrode 116, and a main portion 124 located between the first end portion 120 and the second end portion 122. The electrode 116 is coupled to the build plate 104 via the anchors 118. The anchors 118 facilitate maintaining position of the electrode 116 within the internal passage 112. The main portion 124 of each anchor 118 extends through the respective access port 114 to the electrode 116 such that each anchor 118 does not contact the body portion 106 of the workpiece 100. In another embodiment, the workpiece 100 includes one anchor 118 coupled between the build plate 104 and the electrode 116. In yet another embodiment, the workpiece 100 includes two anchors 118, three anchors 118, four anchors 118, or more than five anchors 118 (not shown) that are coupled between the build plate 104 and the electrode 116.

FIG. 2 is a schematic view of the additive manufacturing system 200 for manufacturing the workpiece 100 and the electrode 116 of FIG. 1. In the embodiment, a model of the workpiece 100 is designed using computer aided design (CAD) software, such that the model includes 3-dimensional coordinates of the workpiece 100 including the body portion 106 and the anchors 118 of FIG. 1. Generally, additive manufacturing provides fast material processing time, innovative joining techniques, and less concern for geometric constraints. In one embodiment, direct metal laser melting (DMLM) or direct metal laser sintering (DMLS) is used to manufacture the workpiece 100. DMLM is a laser-based rapid prototyping and tooling process by which the complex workpiece may be directly produced by precision melting and solidification of metal powder into successive deposit layer of larger structures, each deposit layer corresponding to a cross-sectional layer of the 3-dimensional workpiece 100.

The additive manufacturing system 200 includes an additive manufacturing apparatus 202, a powder delivery apparatus 204, a computer 206, and a laser 208 that functions to manufacture the workpiece 100 and the electrode 116 from a metal powder 210.

The additive manufacturing apparatus 202 is a DMLM apparatus. Alternatively, the additive manufacturing apparatus 202 may be any additive manufacturing apparatus that facilitates manufacturing the workpiece 100 as described herein. The additive manufacturing apparatus 202 includes a powder bed 212 having a first side wall 214 and an opposing second side wall 216. The additive manufacturing apparatus 202 includes a build plate 218 that extends at least partially between the first and second side walls 214 and 216 and that facilitates supporting the workpiece 100 shown in FIG. 1 during manufacturing. In one embodiment, the build plate 218 may be the build plate 104 shown in FIG. 1 for example.

A piston 220 is coupled to the build plate 218 and is capable of being moved between the first and second side walls 214 and 216 of the powder bed 212 along a vertical direction. The piston 220 is adjusted such that a top surface of the build plate 218 defines a working surface 222. The powder delivery apparatus 204 includes a powder supply 224 coupled to a powder distributor 226 that transfers the powder 210 from the powder supply 224 to the additive manufacturing apparatus 202. In the exemplary embodiment, the powder distributor 226 is a wiper configured to distribute an even layer of the powder 210 into the powder bed 212. Alternatively, the powder distributor 226 may be a spray nozzle that transfers the powder 210 from the powder supply 224 to the powder bed 212. Generally, the powder distributor 226 may be any device that transfers powder 210 from the powder supply 224 to the powder bed 212 such that the system 200 operates as described herein.

During operation, the powder distributor 226 distributes a first layer of the powder 210 from the powder supply 224 onto the working surface 222 of the build plate 218. The laser 208 directs a laser beam 228, which is guided by the computer 206, onto the working surface 222 of the build plate 218 to selectively fuse the powder 210 into a cross-sectional layer of the workpiece 100. More specifically, the laser beam 228 selectively fuses the powder 210 into a top surface of the build plate 104 (shown in FIG. 1) by rapidly melting the powder 210 particles together to form a solid. As the laser beam 228 continues to form a portion of each layer, heat is conducted away from the previously melted area, thereby leading to rapid cooling and solidification. In the exemplary embodiment, the computer 206 controls the laser beam 228 such that each layer of the powder 210 will include unsintered powder and sintered powder that forms at least a portion of the cross-sectional layer of the workpiece 100.

In the exemplary embodiment, upon completion of the cross-sectional layer of the workpiece 100, the build plate 218 is lowered by the piston 220 and the powder distributor 226 distributes an additional layer of the powder 210 into the powder bed 212. The laser beam 228 is again controlled by the computer 206 to selectively form another cross-sectional layer of the workpiece 100. This process is continued as successive cross-sectional layers are built into the workpiece 100. Each successive deposit layer of the workpiece 100 may be, for example, between 10 μm (micrometers) and 200 μm in thickness, although the thickness may be selected based on parameters of the additive manufacturing apparatus 202.

Accordingly, the workpiece 100 is manufactured beginning at the bottom surface 102 such that a respective cross-sectional layer of the workpiece 100 may include at least a portion of the body portion 106, the electrode 116, and the anchors 118. More specifically, the additive manufacturing apparatus 202 may facilitate simultaneously forming the body portion 106 and the electrode 116 for example, such that the electrode 116 is formed within the internal passage 112 (shown in FIG. 1) of the workpiece 100. When the additive manufacturing process is completed, any unsintered powder 210 is removed through the access ports 114 (shown in FIG. 1) and the workpiece 100 is removed from the powder bed 212 to facilitate further processing.

In the exemplary embodiment, the workpiece 100 may be manufactured from the metal powder 210 comprising a superalloy for example, a cobalt-based superalloy, such as cobalt-chrome, or a nickel-based superalloy, as well as stainless steels, titanium, chromium, or other alloys, or a combination thereof. Cobalt and nickel-based superalloys are commonly used to manufacture gas turbine components because of the high strength required for long periods of service at the high temperature condition of turbine operation. The metal powder 210 may be selected for enhanced strength, durability, and long periods of service, particularly at high temperatures.

In other embodiments, the workpiece 100 may be manufactured from the metal powder 210 and a plastic powder (not shown) using the additive manufacturing system 200, and the interior surface 110 of the workpiece 100 is manufactured from the metal powder 210.

After manufacturing, the interior surface 110 of the workpiece 100 may have a relatively high roughness, further processing of the workpiece 100 may be required. Such post-manufacturing process may include, for example, stress relief or hardening heat treatments, peening, polishing, hot isostatic pressing (HIP), or ECM. In some embodiments, one or more of the post-manufacturing process listed above are not necessary and may be omitted. In the exemplary embodiment, the workpiece 100 may include relatively high surface roughness caused by the additive manufacturing process. Specifically, the interior surface 110 of FIG. 1 may have relatively high roughness and may not be suitable for use without further processing to facilitate smoothing the interior surface 110.

Figure 3:
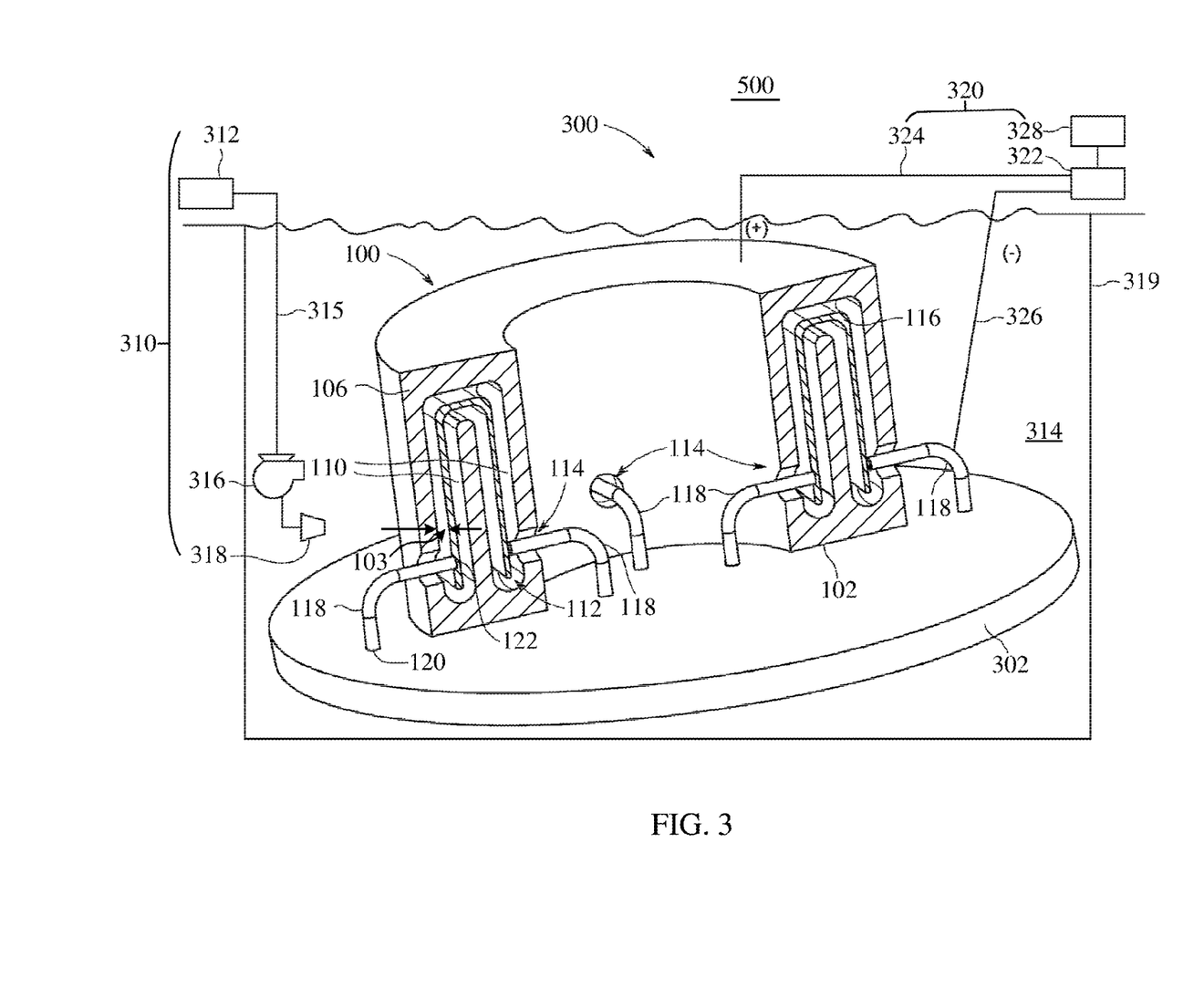
FIG. 3 is a schematic view of an electrochemical machining (ECM) device of a system, the workpiece, and the electrode in accordance with a first embodiment.

FIG. 3 is a schematic view of an electrochemical machining (ECM) device 300 of a system 500, the workpiece 100, and the electrode 116 in accordance with a first embodiment. The ECM device 300 includes an electrolyte supply 310 and a power supply 320. The electrolyte supply 310 includes an electrolyte source 312, a conduit 315, a pump 316, and a nozzle 318. In the embodiment, the electrolyte source 312 may be a storage tank, or the like for example.

In the exemplary embodiment, during ECM, the workpiece 100 is electrically isolated from the electrode 116 and the anchors 118. To facilitate such electrical isolation, the build plate 104 of FIG. 1 is replaced with an electrically non-conductive support plate 302. The body portion 106 is coupled to the support plate 302 via the bottom surface 102 thereof, the electrode 116 is coupled to the support plate 302 via the first end portions 120 of the anchors 118. The electrically non-conductive support plate 302 facilitates isolating the body portion 106 from the electrode 116 and the anchors 118 such that an electric current applied within the ECM device 300 does not flow through the body portion 106 to the electrode 116 and the anchors 118. In a non-limiting embodiment, firstly the build plate 104 is removed from the bottom surface 102 of the body portion 106 and the anchors 118 using conventional machining methods, secondly the build plate 104 is covered with an electrically non-conductive material, such as but not limited to an epoxy, to form an epoxy plate; then the build plate 104 is separated from the epoxy plate using conventional machining methods, finally the epoxy plate is coupled to the bottom surface 102 of the body portion 106 and the anchors 118 to form the support plate 302, therefore the build plate 104 is replaced with the support plate 302.

The power supply 320 includes a power source 322, a positive lead 324, a negative lead 326, and a controller 328. The power source 322 is configured to apply a voltage in the form of a pulsed voltage (and more particularly, a bipolar pulsed voltage) between the workpiece 100 and the electrode 116 to electrochemically remove material from the workpiece 100 such that the interior surface 110 is smoothed. The application of the pulsed voltage to the electrode 116 and to the workpiece 100 electrochemically removes a predetermined amount of material from the interior surface 110 of the internal passage 112. The bipolar, pulsed voltage is applied between the electrode 116 and the workpiece 100 using the power source 322. More specifically, the positive lead 324 is electrically coupled to the body portion 106 and the negative lead 326 is electrically coupled to the electrode 116 via the anchor 118, so as to provide the pulsed voltage to the electrode 116 and to the body portion 106. In the exemplary embodiment, the controller 328 is electrically coupled to the bipolar power source 322 and is configured to perform pulse control. The controller 328 controls the pulse duration, frequency and magnitude of the pulsed voltage supplied to the electrode 116 and the workpiece 100.

The electrolyte supply 310 includes a container 319 configured to contain an electrolyte 314. The electrolyte 314 comprises a charge-carrying fluid, such as but not limited to phosphoric acid. The container 319 is sized sufficiently to receive the electrolyte 314, the workpiece 100, the electrode 116, the anchors 118, and the leads 324 and 326.

The electrolyte 314 is circulated into the internal passage 112 through the access ports 114. In the exemplary embodiment, the electrolyte 314 is stored in the electrolyte source 312 that is in flow communication with the internal passage 112 via the access ports 114. The electrolyte 314 may be circulated into the internal passage 112 by the nozzle 318 of the pump 316 via the access ports 114 for example. The pump 316 is in communication with the electrolyte source 312 via the conduit 315.

The electrolyte 314 is circulated in a gap 103 between the workpiece 100 and the electrode 116; and the voltage, in the form of the pulsed voltage for example, is applied between the workpiece 100 and the electrode 116, so as to cause at least partial dissolution of the interior surface 110. Such dissolution results in smoothing of the interior surface 110 to provide a high-quality surface finish. The electrolyte 314 carries the metal hydroxide formed during ECM away from the workpiece 100 through the access ports 114. As described above, the workpiece 100 may be a gas turbine fuel nozzle or any number of turbine rotor blades to be machined and requires a high-quality surface finish for operation. Compared to conventional machining methods, such as grit blasting, grinding, sanding, or polishing, the electrochemical machining method facilitates smoothing the interior surface 110 without unwanted thermal or mechanical stresses being transferred to the workpiece 100.

After roughness of the interior surface 110 has been removed using the ECM device 300, it may be beneficial to completely remove the electrode 116 from within the internal passage 112.

Figure 4:
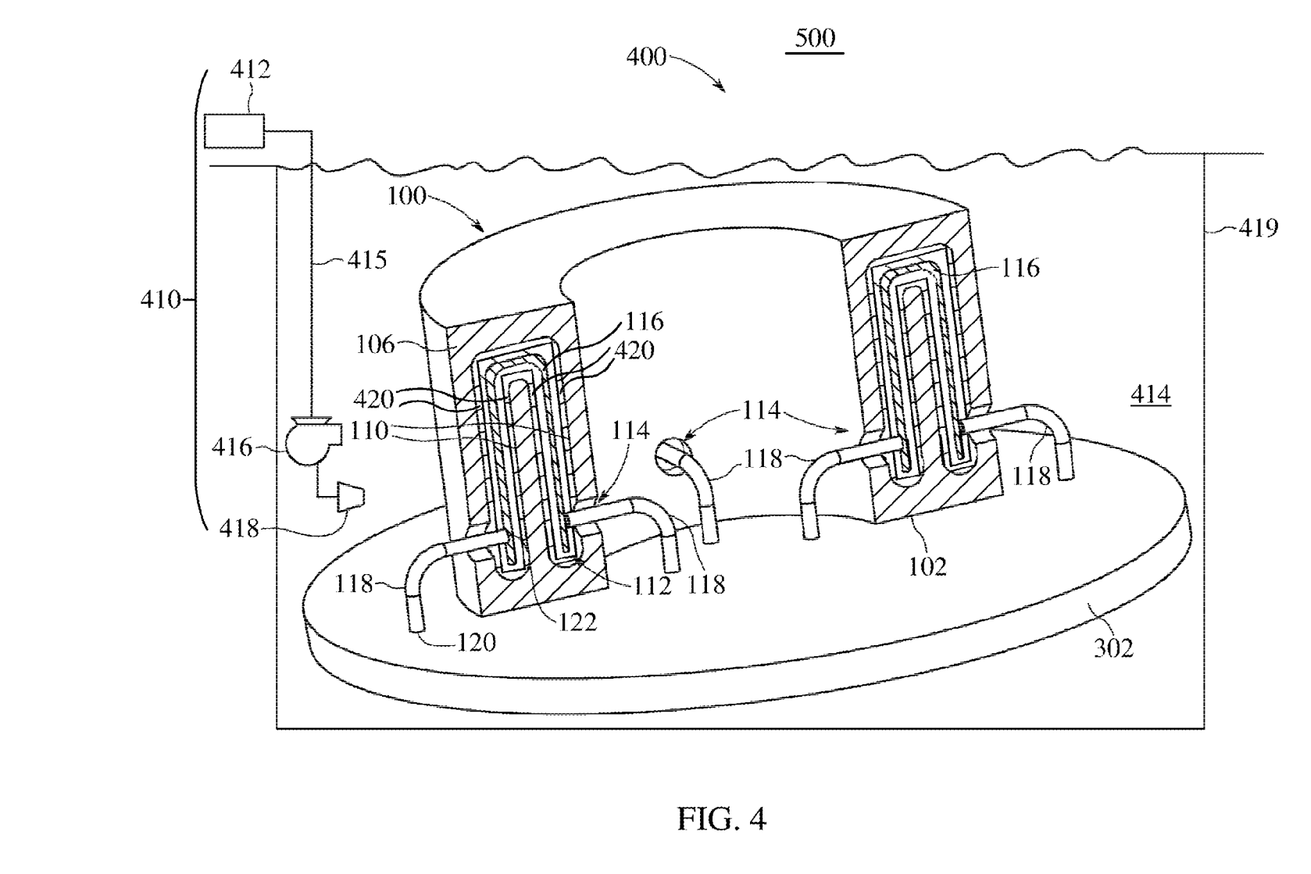
FIG. 4 is a schematic view of a remover of the system, the workpiece, and the electrode in accordance with the first embodiment.

FIG. 4 is a schematic view of a remover 400 of the system 500, the workpiece 100, and the electrode 116 in accordance with the first embodiment. The remover 400 is configured for completely removing the electrode 116 from within the internal passage 112 after smoothing the interior surface 110 of the workpiece 100 as described in FIG. 3. As described herein, "completely removing the electrode 116 from within the internal passage 112" means that the whole electrode 116 is removed from within the internal passage 112.

The remover 400 includes an etching solution supply 410. The etching solution supply 410 includes an etching solution source 412, a conduit 415, a pump 416, and a nozzle 418.

The etching solution source 412 is configured for providing an etching solution 414 to completely remove the electrode 116 from within the internal passage 112. In the embodiment, the etching solution source 412 may be a storage tank, or the like for example.

The etching solution supply 410 includes a container 419 configured to contain the etching solution 414. The container 419 is sized sufficiently to receive the etching solution 414, the workpiece 100, and the electrode 116.

After removing the electrolyte 314 (shown in FIG. 3) from within the internal passage 112, the etching solution 414 is circulated into the internal passage 112 so as to completely dissolve the electrode 116, the etching solution 414 does not contact the smoothed interior surface 110 so as to protect the smoothed interior surface 110 from being dissolved by the etching solution 414. As shown in FIG. 3, the electrolyte 314 may be removed from within the internal passage 112 by the nozzle 318 of the pump 316 for example.

In detail, the etching solution 414 is circulated in the gap 103 between the electrode 116 and the workpiece 100 via the access ports 114. The etching solution 414 may be circulated into the internal passage 112 by the nozzle 418 of the pump 416 for example. The pump 416 is in fluid communication with the etching solution source 412 via the conduit 415.

In the exemplary embodiment, the etching solution 414 includes an acid solution.

In one embodiment, the electrode 116 may be made from Co—Cr alloy, the etching solution 414 may be a hybrid solution of $H_2SO_4$ and $H_3PO_4$ or a hybrid solution of HCl and $HNO_3$, that is the hybrid solution of $H_2SO_4$ and $H_3PO_4$ or the hybrid solution of HCl and $HNO_3$ completely dissolves the electrode 116 that is made from Co—Cr alloy.

In another embodiment, the electrode 116 may be made from stainless steel, the etching solution 414 may be an aqueous solution of $H_2SO_4$ or a hybrid solution of HCl and $HNO_3$, that is the aqueous solution of $H_2SO_4$ or the hybrid solution of HCl and $HNO_3$ completely dissolves the electrode 116 that is made from stainless steel.

The remover 400 includes a corrosion resistant coating 420 for separating the etching solution 414 from the smoothed interior surface 110. The corrosion resistant coating 420 is deposited on the smoothed interior surface 110 to protect the smoothed interior surface 110 from being dissolved by the etching solution 414.

The corrosion resistant coating 420 is removed from within the internal passage 112 after removing the etching solution 414 from within the internal passage 112. The etching solution 414 may be removed from within the internal passage 112 by the pump 416 for example.

In one embodiment, the corrosion resistant coating 420 is formed by wax. Firstly paraffin wax is heated to its melting temperature, then the hot liquid wax is filled into the gap 103 between the smoothed interior surface 110 and the electrode 116, the corrosion resistant coating 420 is deposited on the smoothed interior surface 110 when the hot liquid wax has cooled down to room temperature. The corrosion resistant coating 420 is removed from within the internal passage 112 by heating.

In another embodiment, the corrosion resistant coating 420 is formed by slurry, which relates to a new printing technology that spreads out a thin layer of the slurry composed of ceramic embedded in a polymer precursor. When a pattern of ultraviolet light is projected on this layer, the material solidifies only where it's been exposed to the light. Another layer of slurry is spread out on top of this and flashed with light, and the structure is built up in this way, layer by layer.

In yet another embodiment, the corrosion resistant coating 420 is formed by an aqueous solution of polymethyl methacrylate (PMMA), and the corrosion resistant coating 420 is deposited on the smoothed interior surface 110 via dipping for example. The corrosion resistant coating 420 is removed from within the internal passage 112 by etching. In detail, the corrosion resistant coating 420 is dissolved in a suitable solvent including acetone for example.

Figure 5:
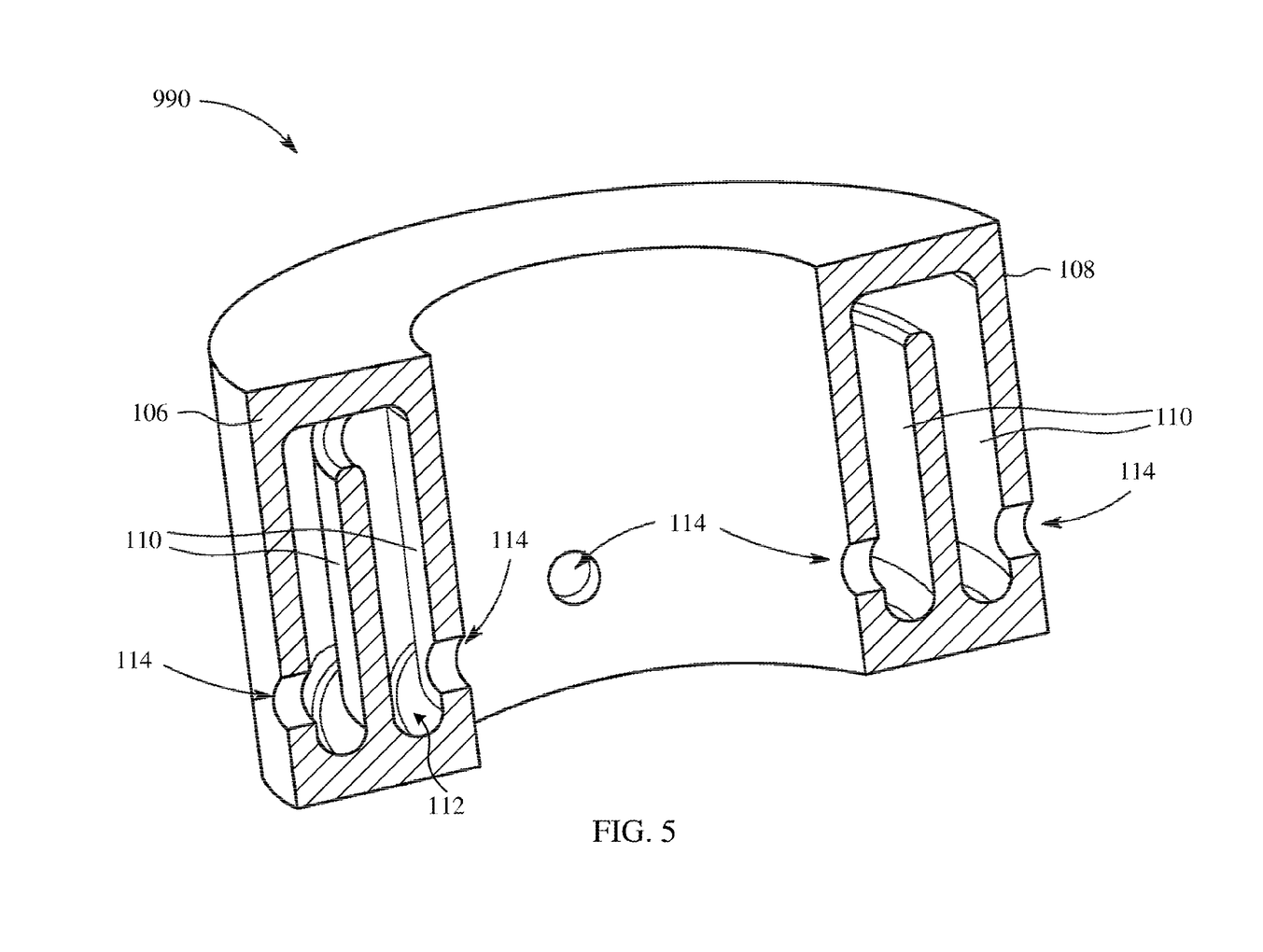
FIG. 5 is a perspective cross-sectional view of an article after machining from the workpiece of FIG. 3 by the ECM device of FIG. 3 and the remover of FIG. 4.

FIG. 5 is a perspective cross-sectional view of an article 990 after machining from the workpiece 100 of FIG. 3 by the ECM device 300 of FIG. 3 and the remover 400 of FIG. 4. In the article 990 of FIG. 5, the roughness has been removed from the interior surface 110 by the ECM device 300, as shown in FIG. 3; the electrode 116, as shown in FIGS. 1 and 3-4, has been completely removed from the internal passage 112 as described above; the anchors 118 and the support plate 302, as shown in FIG. 3, has been machined away from the workpiece 100 of FIG. 3.

Figure 6:
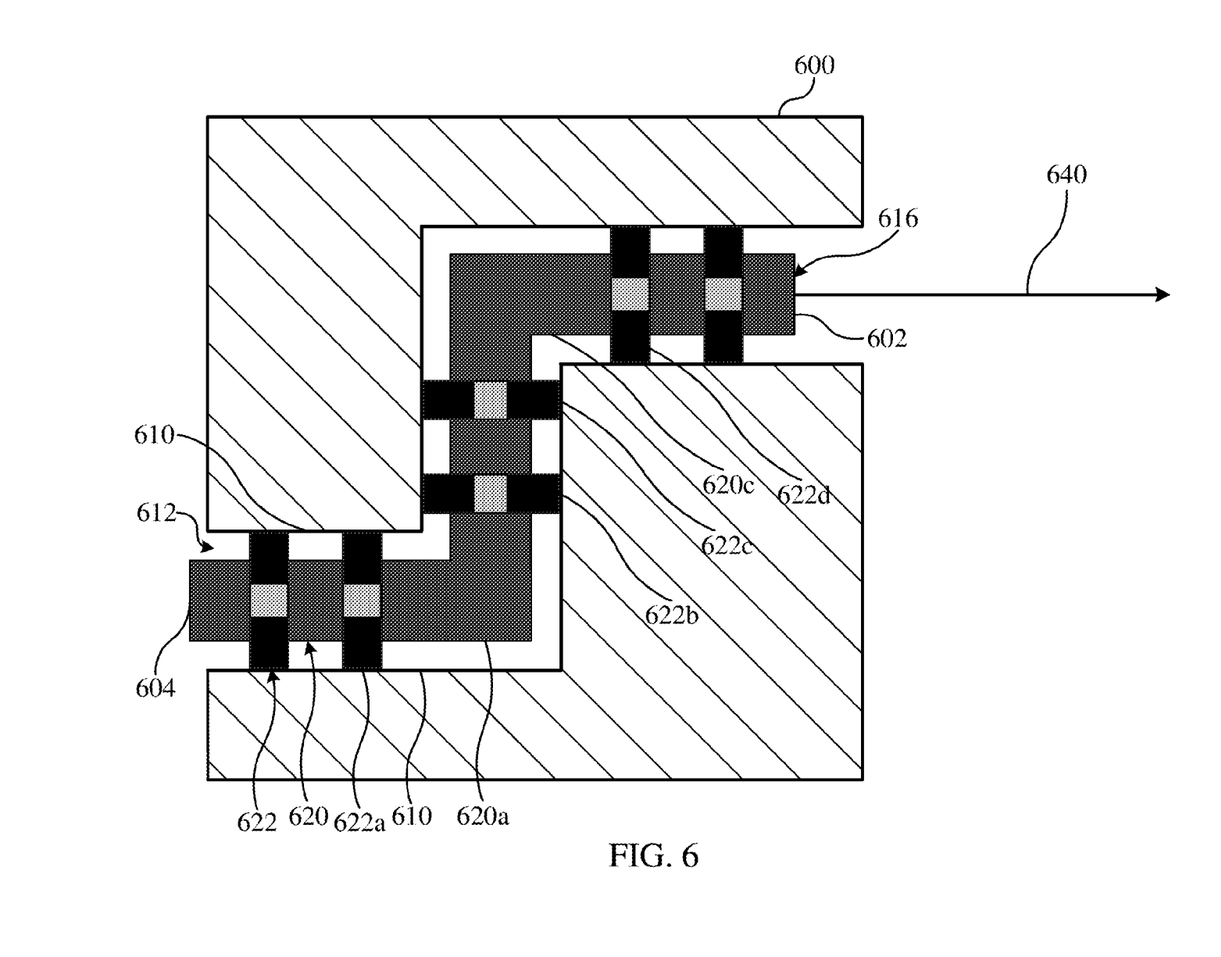
FIG. 6 is a cross-sectional view of a workpiece, an electrode, and a leader.

FIG. 6 is a cross-sectional view of a workpiece 600, an electrode 616, and a leader 640. The workpiece 600 includes an interior surface 610 that defines an internal passage 612. In other embodiments, the workpiece 600 includes a plurality of interior surfaces 610 (not shown) that define respective internal passages 612 (not shown).

The electrode 616 includes a first end 602 and an opposing second end 604. In the embodiment, the electrode 616 is flexible so as to ensure the electrode 616 is capable of being inserted into the internal passage 612, such that the electrode 616 is located within the internal passage 612, as shown in FIG. 6. In detail, the leader 640 is mechanically connected to the first end 602 of the electrode 616, the leader 640 is configured for pulling the electrode 616 to be inserted into the internal passage 612.

In other embodiments, a plurality of electrodes 616 (not shown) are inserted into the internal passage 612 by respective pulling forces of respective leaders 640 (not shown), such that the plurality of electrodes 616 are located within the internal passage 612.

The internal passage 612 is nonlinear, that is, the workpiece 600 has complex internal geometries, such as turns, vaults, convergent and divergent passages, cavities, dead legs, and holes, etc. In one embodiment, the internal passage 612 is a spiral or twisted internal passage or has varying cross-sectional dimensions in an axial direction.

In detail, the electrode 616 includes first portions 620 and second portions 622. The first portions 620 and the second portions 622 may be formed together using additive manufacturing for example. Each of the first portions 620 and each of the second portions 622 are assembled next to each other. In detail, the first portions 620 include two first portions 620a, 620c; the second portions 622 include four second portions 622a, 622b, 622c, 622d. When the electrode 616 is inserted into the internal passage 612, the first portions 620a, 620c may be deformed due to complex structure of the internal passage 612, such that a distance between the second portions 622a, 622b and a distance between the second portions 622c, 622d may be changed.

Figure 7:
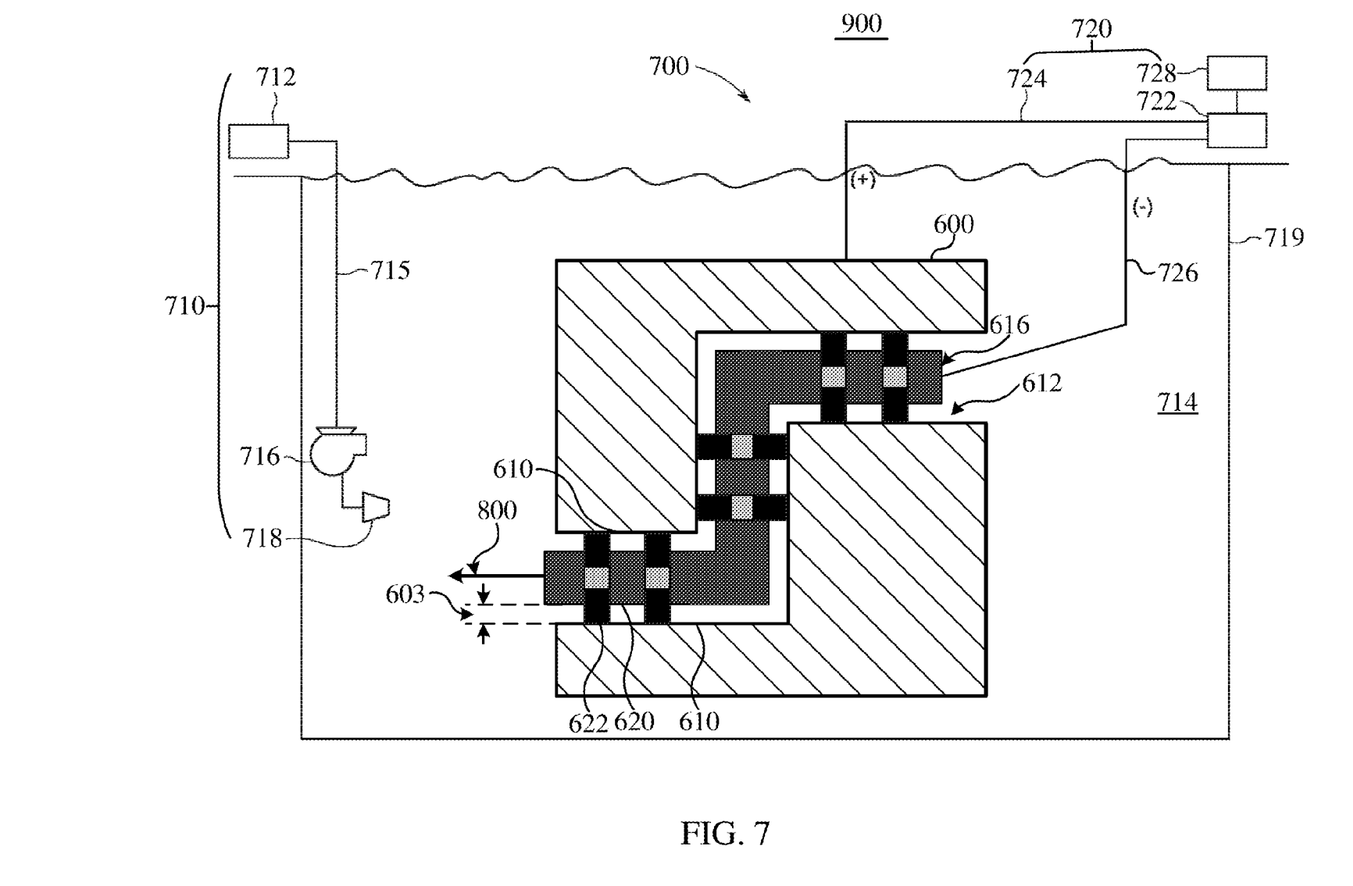
FIG. 7 is a schematic view of the ECM device of a system, the workpiece, and the electrode in accordance with a second embodiment.

FIG. 7 is a schematic view of an ECM device 700 of a system 900, the workpiece 600, and the electrode 616 in accordance with a second embodiment. The ECM device 700 includes an electrolyte supply 710 and a power supply 720. The electrolyte supply 710 includes an electrolyte source 712, a conduit 715, a pump 716, a nozzle 718, and a container 719. The power supply 720 includes a power source 722, a positive lead 724, a negative lead 726, and a controller 728.

The container 719 is sized sufficiently to receive an electrolyte 714 of the electrolyte source 712, the workpiece 600, the electrode 616, and the leads 724 and 726.

In the embodiment, the electrode 616 is electrically isolated from the interior surface 610 of the workpiece 600, which will be described in FIG. 8. The positive lead 724 is electrically coupled to the workpiece 600, the negative lead 726 is electrically coupled to the electrode 616.

Similar to FIG. 3, the electrolyte 714 is circulated in a gap 603 between the workpiece 600 and the electrode 616 by the nozzle 718 of the pump 716 for example; and a voltage of the power source 722, in the form of a pulsed voltage for example, controlled by the controller 728 is applied between the electrode 616 and the workpiece 600; so as to facilitate smoothing the interior surface 610. The pump 716 is in fluid communication with the electrolyte source 712 via the conduit 715.

In one embodiment, the workpiece 600 may be the workpiece 100 shown in FIGS. 1 and 3-4 for example; the interior surface 610 may be the interior surface 110 shown in FIGS. 1 and 3-4 for example; and the internal passage 612 may be the internal passage 112 shown in FIGS. 1 and 3-4 for example.

Figure 8:
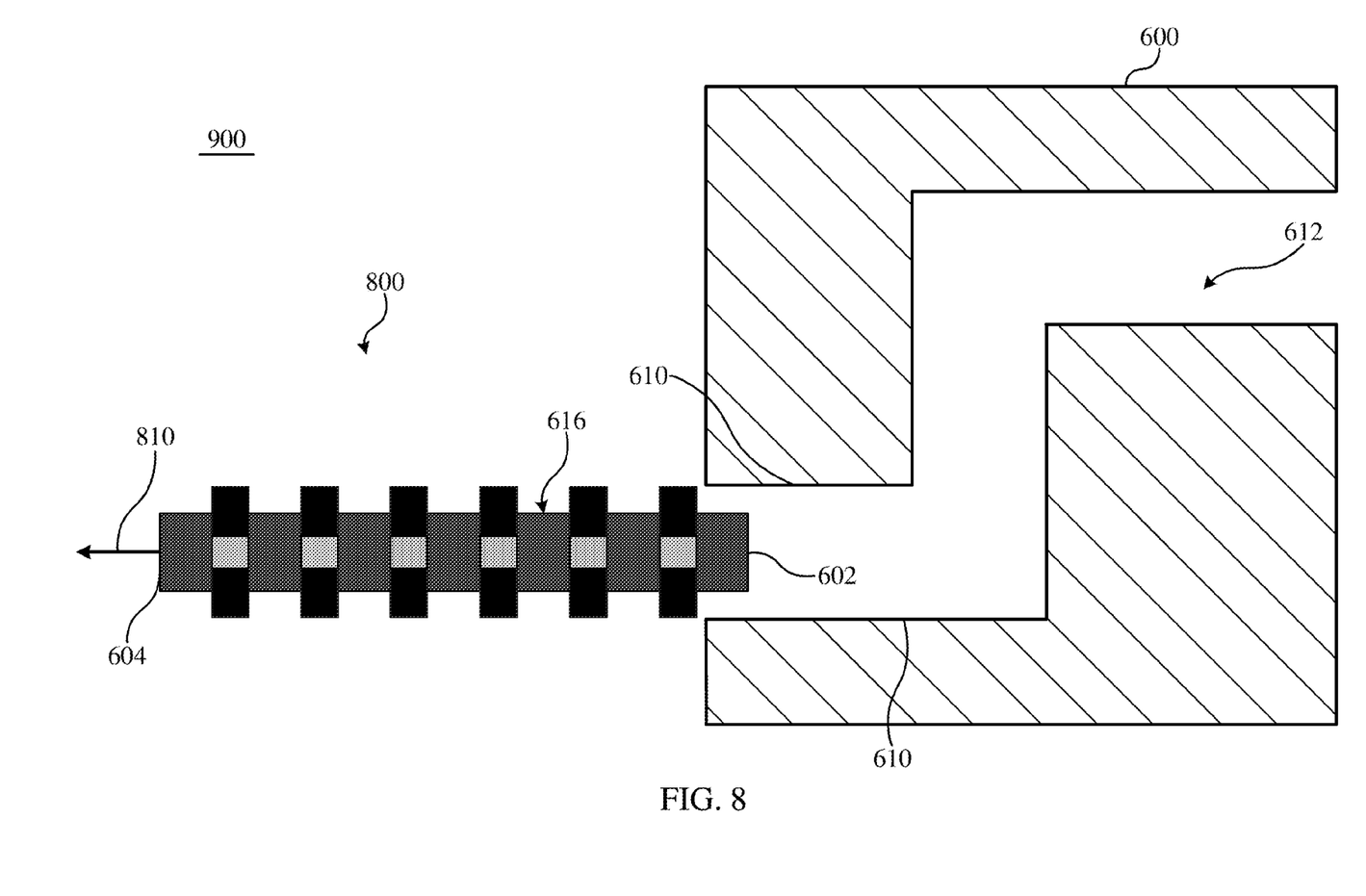
FIG. 8 is a schematic view of a remover of the system, the workpiece, and the electrode in accordance with the second embodiment.

FIG. 8 is a schematic view of a remover 800 of the system 900, the workpiece 600, and the electrode 616 in accordance with the second embodiment. The remover 800 is configured for completely removing the electrode 616 from within the internal passage 612 after smoothing the interior surface 610 of the workpiece 600 as described in FIG. 7. As described herein, "completely removing the electrode 616 from within the internal passage 612" means that the whole electrode 616 is removed from within the internal passage 612.

The electrode 616 is flexible so as to ensure the electrode 616 is capable of being removed out of the internal passage 612. In detail, the remover 800 includes a leader 810 mechanically connected to the second end 604 of the electrode 616. The leader 810 is configured for pulling the electrode 616 to be removed out of the internal passage 612 after removing the electrolyte 714 shown in FIG. 7 from within the internal passage 612, such that the electrode 616 is completely removed from within the internal passage 612. In one embodiment, the electrolyte 714 may be removed from within the internal passage 612 via the nozzle 718 of the pump 716 shown in FIG. 7 for example.

In other embodiments, the plurality of electrodes 616 (not shown) are removed out of the internal passage 612 by respective pulling forces of the respective leaders 810 (not shown), such that the plurality of electrodes 616 are completely removed from within the internal passage 612.

In other embodiments, the remover 800 includes the leader 640, as shown in FIG. 6; the leader 640 is configured for pulling the electrode 616 to be inserted into the internal passage 612 or pushing the electrode 616 to be removed out of the internal passage 612.

Figure 9:
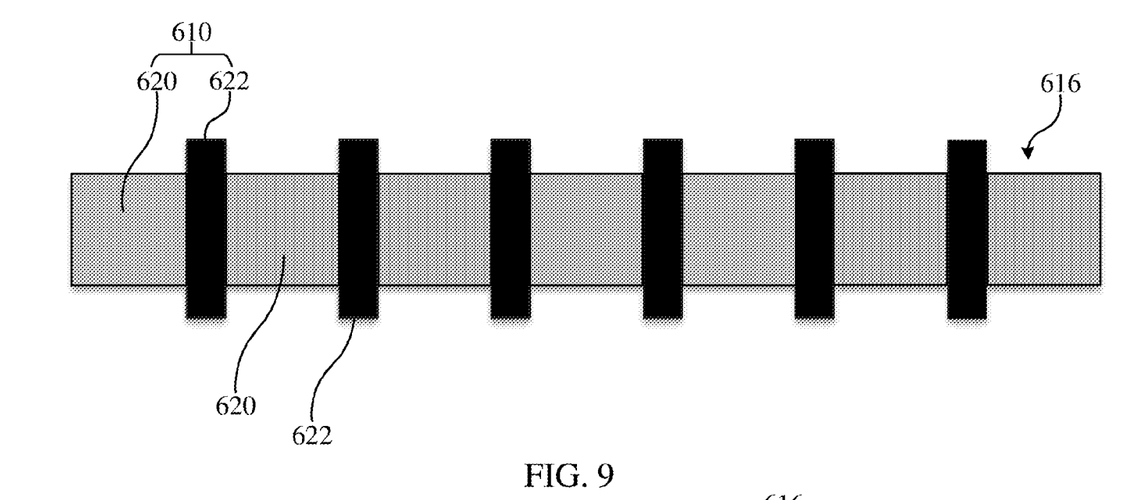
FIG. 9 is a schematic view of the electrode shown in FIG. 6 and partially formed by additive manufacturing.

FIG. 9 is a schematic view of the electrode 616 shown in FIG. 6 and partially formed by additive manufacturing. In FIG. 9, the electrode 616 includes an electrically non-conductive mandrel 610 consisting of the first portions 620 and the second portions 622. The first portions 620 and the second portions 622 are formed together using an additive manufacturing apparatus, such as the additive manufacturing apparatus 202 shown in FIG. 2.

In the exemplary embodiment, each of the first portions 620 is made from electrically non-conductive material, and each of the second portions 622 is also made from electrically non-conductive material. The first portions 620 and the second portions 622 are sized so as to provide electrical isolation between the electrode 616 and the workpiece 600. As a non-limiting example, the width of each second portion 622 is sized to be greater than the width of each first portion 620, so as to provide electrical isolation between the electrode 616 and the workpiece 600, as shown in FIG. 6.

In the exemplary embodiment, each of the first portions 620 and each of the second portions 622 are assembled next to each other.

In a specific embodiment, each of the first portions 620 is made from a rigid plastic material, and each of the second portions 622 is made from a soft plastic material. In one embodiment, the rigid plastic material includes polyvinyl chloride, high density polyethylene (HDPE), etc; the soft plastic material includes polypropylene, low density polyethylene (LDPE), etc.

In the exemplary embodiment, a method for partially manufacturing the electrode 616 with the additive manufacturing apparatus, such as the additive manufacturing apparatus 202 of FIG. 2, is provided. The additive manufacturing apparatus used herein refers to an apparatus, such as a selective laser melting apparatus, an electron beam melting apparatus, a fused deposition modeling apparatus, or a stereolithography apparatus; wherein materials are added sequentially in a layer-by-layer fashion with the purpose of creating the electrode 616. The method comprises: providing a digital representation, such as a CAD (Computer Aided Design) model, of the electrode 616; creating a sequence or stack of layers based on the digital representation, applying manufacturing parameters to each of those layers based on the digital representation, and producing the physical electrode 616 by sequentially adding and consolidating material for each layer on top of the previous layer until the entire electrode 616 is completed.

The process of adding material and consolidating material may be executed in parallel, or in sequence, or a combination of both.

In certain embodiments, the use of an additive manufacturing process may comprise consolidating the rigid plastic material in one or more layers, or regions of layers according to the digital representation of the electrode 616 while consolidating the soft plastic material in the alternate layers or regions of layers according to the digital representation of the electrode 616. This additive manufacturing process is repeated until the final shape of the electrode 616 including the first portions 620 and the second portions 622 is obtained.

In one embodiment, powder of the rigid plastic material is delivered additively to a build layer or region of a layer while a thermal source, such as a laser, is used to join the powder together. The process is repeated until the first portion 620 of a desired shape is obtained. Then powder of the soft plastic material is delivered additively to alternate layers or regions of layers and joined together with the first portion 620, and the process is repeated until the second portion 622 of a desired shape is obtained. The delivery and joining of the rigid plastic material and the soft plastic material using an additive manufacturing process may be alternated and/or repeated until the final shape of the electrode 616 including the first portions 620 and the second portions 622 is obtained.

In another embodiment, the rigid plastic portion (the first portion 620) is manufactured by one additive manufacturing machine, and the soft plastic portion (the second portion 622) is manufactured by another additive manufacturing machine. The process is repeated until a sufficient number of the first portions 620 and the second portions 622 is produced, and the electrode 616 is assembled by conventional means.

Figure 10:
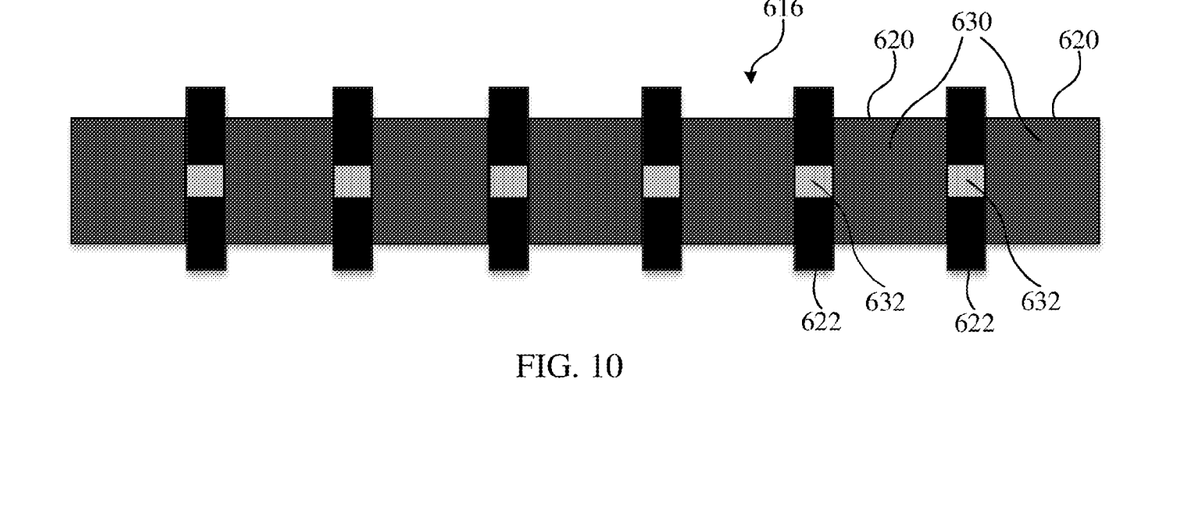
FIG. 10 is a schematic view of the electrode shown in FIG. 6 and formed by electroplating after additive manufacturing.

FIG. 10 is a schematic view of the electrode 616 shown in FIG. 6 and formed by electroplating after additive manufacturing. In FIG. 10, the electrode 616 includes electrically conductive coatings 630 and electrically conductive strips 632. The electrically conductive coatings 630 are formed on the respective first portions 620, the electrically conductive strips 632 are formed on the respective second portions 622.

In one embodiment, each of the electrically conductive strips 632 is formed on a middle of the corresponding second portion 622.

The electrically conductive coatings 630 and the electrically conductive strips 632 are coupled together to provide electrical conductivity of the electrode 616.

The electrically conductive coatings 630 include metal coatings, the metal coatings are formed on the respective first portions 620 using electroplating. The electrically conductive strips 632 include metal strips, the metal strips are formed on the respective second portions 622 using electroplating.

The electrode 616 is made in a sequence of steps including a first step of forming the non-conductive mandrel 610 by additive manufacturing and a second stop of forming the conductive coatings 630 on the respective non-conductive first portions 620 by electroplating and forming the conductive strips 632 on the respective non-conductive second portions 622 by electroplating. Uncoated sections of the mandrel 610 maintain the electrical isolation between the anode and the cathode during ECM.

The embodiments of the present invention is used for firstly electrochemical machining the interior surface 110 of the workpiece 100 by the ECM device 300 of FIG. 3 or electrochemical machining the interior surface 610 of the workpiece 600 by the ECM device 700 of FIG. 7, then completely removing the electrode 116 from within the internal passage 112 of the workpiece 100 or completely removing the electrode 616 from within the internal passage 612 of the workpiece 600, so as to form the article 990, which may be shown in FIG. 5 for example.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure will not be limited to the particular embodiment disclosed as the best mode contemplated for carrying out this disclosure, but that the disclosure will include all embodiments falling within the scope of the appended claims.

The invention claimed is:

1. A system for machining a workpiece, the workpiece comprising an interior surface that defines an internal passage, the system comprising:
    an electrode located within the internal passage and electrically isolated from the workpiece, the electrode comprising:
        a plurality of first portions comprising an electrically non-conductive material and an electrically conductive coating, the electrically conductive coating formed on the electrically non-conductive material of the respective first portions; and
        a plurality of second portions comprising an electrically non-conductive material and an electrically conductive strip, the electrically conductive strip formed on the electrically non-conductive material of the respective second portions;
    an electrolyte supply configured to supply an electrolyte in a gap between the electrode and the workpiece;
    a power supply configured to supply a voltage between the electrode and the workpiece to obtain a smoothed interior surface on the interior surface; and a remover configured to remove the electrode from within the internal passage after the smoothed interior surface is obtained, the remover comprising a corrosion resistant coating and an etching solution supply, the etching solution supply configured to supply an etching solution configured to chemically dissolve the electrode for removal of the electrode from within the internal passage.

2. The system of claim 1, wherein the electrode is formed within the internal passage using an additive manufacturing apparatus, and the etching solution supplied into the internal passage completely dissolves the electrode formed within the internal passage without contacting the smoothed interior surface.

3. The system of claim 2, wherein the corrosion resistant coating of the remover is configured to protect the smoothed interior surface from being dissolved by the etching solution; and wherein the corrosion resistant coating is configured to be removed from within the internal passage after the etching solution is removed from within the internal passage.

4. The system of claim 3, wherein the corrosion resistant coating is a build up from a slurry.

5. The system of claim 3, wherein the corrosion resistant coating is a deposit from an aqueous solution.

6. The system of claim 1, wherein the electrode comprises a solid electrode, a hollow electrode, or a combination thereof.

7. The system of claim 1, wherein the plurality of first portions and the plurality of second portions are formed together using an additive manufacturing apparatus, the electrically conductive coatings and the electrically conductive strips are coupled together to provide electrical conductivity to the electrode.

8. The system of claim 1, wherein each of the first portions and each of the second portions are assembled next to each other.

9. The system of claim 1, wherein the plurality of first portions is made from a rigid electrically non-conductive material, the plurality of second portions is made from a soft electrically non-conductive material; the plurality of first portions and the plurality of second portions being sized to provide electrical isolation between the electrode and the workpiece.

10. The system of claim 1, wherein each of the first portions is made from a rigid plastic material, and each of the second portions is made from a soft plastic material.

11. The system of claim 1, wherein the electrically conductive coatings comprise metal coatings, the metal coatings are formed on the respective first portions using electroplating; and wherein the electrically conductive strips comprise metal strips, the metal strips are formed on the respective second portions using electroplating.

12. The system of claim 1, wherein the electrode is a plurality of electrodes located within the internal passage and electrically isolated from the workpiece; and
wherein the electrolyte supply is configured to supply the electrolyte in the gap between each electrode of the plurality of electrodes and the workpiece; the power supply is configured to supply the voltage between each electrode of the plurality of electrodes and the workpiece to smooth the interior surface to obtain a smoothed interior surface; and the remover is configured to completely remove the plurality of electrodes from within the internal passage after the smoothed interior surface is obtained.

13. A system for machining a workpiece, the workpiece comprising an interior surface that defines an internal passage, the system comprising:
an electrode located within the internal passage and electrically isolated from the workpiece, the electrode comprising
a plurality of first portions comprising an electrically non-conductive material and an electrically conductive coating, the electrically conductive coating formed on the electrically non-conductive material of the respective first portion, and
a plurality of second portions comprising an electrically non-conductive material and an electrically conductive strip, the electrically conductive strip formed on the electrically non-conductive material of the respective second portion;
an electrolyte supply configured to supply an electrolyte in a gap between the electrode and the workpiece;
a power supply configured to supply a voltage between the electrode and the workpiece to obtain a smoothed interior surface on the interior surface; and
a remover configured to remove the electrode from within the internal passage after the smoothed interior surface is obtained, the remover comprising a corrosion resistant coating and an etching solution supply, the etching solution supply configured to supply an etching solution configured to chemically dissolve the electrode for removal of the electrode from within the internal passage;
wherein the electrode is flexible to ensure the electrode is capable of being inserted into the internal passage, and a leader is connected to the electrode, the leader configured to pull the electrode into the internal passage.

14. The system of claim 13, wherein the internal passage is a spiral or twisted internal passage or has varying cross-sectional dimensions in an axial direction.

15. A method for machining a workpiece, the workpiece comprising an interior surface that defines an internal passage, the method comprising:
locating an electrode within the internal passage, the electrode comprising
a plurality of first portions comprising an electrically non-conductive material and an electrically conductive coating, the electrically conductive coating formed on the electrically non-conductive material of the respective first portion, and
a plurality of second portions comprising an electrically non-conductive material and an electrically conductive strip, the electrically conductive strip formed on the electrically non-conductive material of the respective second portion,
the located electrode being electrically isolated from the workpiece;
circulating an electrolyte in a gap between the electrode and the workpiece;
applying a voltage between the electrode and the workpiece to facilitate smoothing of the interior surface to obtain a smoothed interior surface; and
removing the electrode from within the internal passage via a remover after obtaining the smoothed interior surface, the remover comprising a corrosion resistant coating and an etching solution supply, and removing the electrode via the remover comprises
applying the corrosion resistant coating as a build up or a deposit on the smoothed interior surface,
supplying an etching solution to the internal passage via the etching solution supply, and chemically dissolving the electrode for removal of the electrode from within the internal passage.

16. The method of claim 15, wherein the workpiece is formed by additive manufacturing;
wherein locating the electrode within the internal passage comprises:
forming the electrode by additive manufacturing within the internal passage;
wherein removing the electrode from within the internal passage comprises:
after removing the electrolyte from within the internal passage, circulating the etching solution in the internal passage, but without contacting the smoothed interior surface.

17. The method of claim 16, further comprising: depositing the corrosion resistant coating on the smoothed interior surface to protect the smoothed interior surface from being dissolved by the etching solution;
removing the corrosion resistant coating from within the internal passage after removing the etching solution from within the internal passage.

18. The method of claim 15, wherein the electrode is a flexible electrode configured for insertion into the internal passage.

* * * * *